Patented Oct. 25, 1949

2,485,779

UNITED STATES PATENT OFFICE 2,485,779

SELECTIVE ENZYME HYDROLYSIS

Judson H. Sanders, Wyoming, Ohio, assignor to The Procter & Gamble Company, Cincinnati, Ohio, a corporation of Ohio No Drawing. Application October 27, 1945, Serial No. 625,105

10 Claims. (Cl. 195—30)

This invention relates to the separation of a selected glyceride fraction from a mixture of triglycerides, and more specifically to the preparation of improved drying oil from fish oil, by a process which employs enzyme hydrolysis.

An object of my invention is to derive from fish oil a drying oil having drying properties which are markedly superior to those of the original fish oil, and which are comparable with those of the better natural drying oils such as linseed oil and tung oil.

Another object of the invention is, in the preparation of improved drying oil from fish oil, to obtain as a by-product a fatty acid fraction which is more valuable as a soapmaking material than the original fish oil, and which is comparable to the commonly used animal fats as a soapstock.

Another object is to accomplish the above ends by subjecting fish oil to controlled enzyme hydrolysis such that the saturated and the least unsaturated of the unsaturated fatty acids are liberated in preference to the more highly unsaturated fatty acids.

Other objects of the invention are to stop the enzyme hydrolysis of fish oil when it has progressed to a point such that the unhydrolyzed glycerides are of an average degree of unsaturation which is suitable in a good drying oil; and to separate the liberated fatty acids and glycerin from the remaining glycerides in a manner which is not injurious to quality, nor detrimental to high yields of the principal end-products.

Another object is to prepare a good drying oil and a good soapstock from fish oil by means of an economical and commercially feasible process.

A broad object of my invention is to liberate a substantial proportion of those combined fatty acids, comprised in a mixture of triglycerides, which are preferentially hydrolyzed by enzymes under the conditions of my process; and a more specific object is to liberate a substantial proportion of the lower molecular combined fatty acids from a mixture of glycerides which comprises fatty acid radicals within the range $C_{12}$ to $C_{24}$ wherein the highest molecular weight fatty acid radical contains at least six more carbon atoms than the lowest.

The ability of lipolytic enzymes, such as pancreatic lipase (steapsin) and castor bean lipase (ricinus lipase), to hydrolyze fats with the formation of fatty acids and glycerin has long been known. Although this phenomenon is of profound importance in biology and has been studied extensively in this connection, it has heretofore not been utilized to any important extent in industry, so far as the present applicant is aware. In the glyceride fat industry, enzyme hydrolysis is not competitive economically with other known and commonly practiced hydrolytic methods, particularly caustic saponification (followed if desired by acidulation), Twitchell saponification, or high temperature-high pressure hydrolysis of fats.

It is well known that fish oils are rich in unsaturated fatty acid radicals, having two or more olefinic double bonds, and that fish oils when substantially freed of their more saturated fatty constituents are good drying oils and may be employed to advantage in the manufacture of paints, varnish, and the numerous other products in which drying oils such as linseed oil are used. A number of processes have been suggested for making improved drying oil out of fish oil, the simplest of these being fractional solvent extraction of the more unsaturated triglycerides. Other processes comprise either fractional distillation or fractional crystallization of the mixed fatty acids of fish oil, followed in each case by reesterification of the more unsaturated fatty acid fraction with glycerin, to form a highly unsaturated mixture of triglycerides.

I have discovered that enzyme hydrolysis provides a new and highly advantageous means of removing saturated fatty acid radicals and a substantial proportion of mono-olefinic fatty acid radicals from fish oils, and that a commercially economical process for making improved drying oils may be based thereon. Essential features of my invention are the discoveries that partial enzyme hydrolysis of fish oil under suitably controlled conditions leaves an unhydrolyzed glyceride fraction having a materially higher degree of unsaturation as compared with the starting material, and that the free fatty acids which are liberated are of such a moderately low degree of unsaturation that they are, when separated from the glycerides and without further processing, of value for making soap of good quality. Preferred features of the invention comprise a simple and practical means of stopping the enzyme hydrolysis after a desired degree of splitting has been reached, also an advantageous method of separating the liberated fatty acids and glycerin from the glyceride drying oil portion.

Although the mechanism of the hydrolytic enzyme action is not fully understood and my invention is not to be limited by any theory regarding this action, it is my belief that the selective action of the lipase, in liberating saturated and mono-olefinic fatty acids in preference to the polyolefinic fatty acids in fish oil, is more a result of differences in length of carbon chain than a result of differences in saturation. There is considerable evidence, in fact, that unsaturated fatty acids tend to be liberated somewhat in preference to saturated acids from a mixture initially containing equal amounts of the two combined as triglycerides, provided the unsaturated fatty acids contain the same number of carbon atoms per molecule as the saturated acids, this being a tendency which is adversed to the objects of my invention. I have obtained evidence that fatty acids of an intermediate range of chain lengths, about $C_{12}$ to $C_{16}$, are most readily split from triglyceride molecules by enzyme action as conducted in my process, and that the ease of splitting appears to decrease progressively as the fatty acid chain length falls below $C_{12}$ and as it increases above $C_{16}$. When the mixture of glycerides which is subjected to controlled attack by the lipase comprises fatty acid radicals differing in length of chain by as much as six or more carbon atoms this selective action becomes quite pronounced, and is then much more pronounced than such selective action as may be due to differences in saturation. Thus my invention is particularly applicable to selective hydrolysis of mixtures of glycerides generally which comprise higher fatty acids of a relatively broad range of chain lengths, and it is not confined to treating oils of marine origin, nor to treating oils of any particular range of unsaturation. Its commercial advantages are most pronounced in separating fatty acids of 12 to 18 carbon atoms from glyceride mixtures in which the longest fatty acid radicals contain at least 6 more carbon atoms than the shortest and in which the range of fatty acid radicals may be from $C_{12}$ to $C_{24}$.

The invention may be illustrated by means of the following typical applications of the process.

*Example 1.*—To a mixture of menhaden and sardine oils having an iodine value of 181, which had been clarified by treatment with fuller's earth followed by filtration, and which is held at a temperature of 90° F. to 105° F. in a tank equipped with a mechanical agitator, there is added 1% by weight of solvent extracted ground castor bean meal which has been recently prepared at temperatures not exceeding about 120° F. (care being exercised in the handling of this meal because of its toxicity), also 6% by weight of water, and 0.015% by weight of commercial acetic acid. These materials are well stirred throughout the oil and then the mass is allowed to stand for some hours. After 10 to 12 hours, the oil is sampled at hourly intervals and these samples are tested to determine the extent of hydrolysis and/or the extent of the iodine value increase in the glycerides which remain unsplit. About 16 hours after the acidulation of the lipase, when the free fatty acid content of the oil has reached 25%, the glycerin layer which has formed below the oil is drawn off through an outlet at the bottom of the tank, 1% by weight of a filter aid such as kieselguhr is added to the oil while agitating mechanically and while heating to about 130° F. to 180° F., and the charge is then filtered. This heating partially or completely inactivates the lipase, and the filtration removes it and also removes traces of glycerin, water, and acetic acid.

The glycerin layer, which contains some water and much of the castor bean meal, is somewhat diluted with water and filtered, and the glycerin in the filtrate is purified by well known means.

The glyceride-fatty acid mixture is pumped through a tubular heat exchanger where its temperature is raised to about 300° C., and then into a flash distillation still of the general type illustrated in Mills Patent 2,274,801 or 2,274,802.

The fatty acids which distill over have a composite iodine value of about 100, a titer of 39° to 40° C., and a light color, and when saponified with caustic soda yield a detergent soap of good quality.

The glycerides which remain undistilled and which includes small amounts of diglycerides and monoglycerides, have a composite iodine value of about 208, and when painted on a vertical glass plate, they form a non-tacky film about 10% faster than refined linseed oil subjected to the same test. When heat bodied in the presence of lead and manganese driers, the glycerides made by the present process "dry" faster than commercially boiled linseed oil. The drying oil of this process may be improved in color, if desired, by bleaching with fuller's earth. The free hydroxyl groups of the monoglycerides and diglycerides in the oil may be esterified with suitable fatty acids or other acids if desired.

Each 100 pounds of the partially hydrolyzed filtered oil which is fed to the still yields about 23 pounds of fatty acids and about 75 pounds of drying oils, and about 2 pounds are degraded to hot well "clabber" stock.

The saponification value of the fatty acid fraction is about 206, and of the glyceride oil fraction about 186.

All iodine values referred to in this specification are determined by the Wijs method.

*Example 2.*—To 100 parts by weight of sardine oil having an iodine value of 188 there was added with stirring an aqueous phase consisting of 6 parts water, one part steapsin, and one part bile salts. After standing about 16 hours at a temperature of approximately 100 F. the oil, which then contained 21.2% of free fatty acids, was treated with caustic soda to neutralize the free fatty acids, and the oil and foots were then separated by dissolving the mass in aqueous ethyl alcohol and extracting the neutral oil by means of petroleum ether. The resulting glycerines after removal of solvent had a composite iodine value of 208.5 and a saponification value of 180, and the fatty acids of the soap had a composite iodine value of 139 and a saponification value of 200.

*Example 3.*—Another lot of the oil used in Example 2, treated similarly with steapsin until the free fatty acid content was 23.0 per cent, was separated by the procedure used in Example 2 into a neutral oil fraction having an iodine value of 221 and a soap fraction the fatty acids of which had a composite iodine value of 113.

Improved drying oils are obtainable by my process from any of the fish oils and particularly those of high iodine value such as pilchard, sardine, and menhaden oils. The process is also applicable to treatment of fish oils of somewhat lower iodine value such as herring oil, and to marine animal oils such as whaleoil and seal oil, and all of these are included within the scope of the claims.

The lipase used in the process may be that contained in any of the oil seeds such as cottonseed, soybean, sunflower seed, castor bean, and peanut, or that obtainable from animal tissues, such as steapsin. The lipase is preferably activated by any of the means disclosed in the extensive literature on enzyme hydrolysis. In general, the use of a small amount of acetic acid is effective, although with steapsin bile salts are more commonly employed. When an acid is used an organic acid such as acetic is preferred, although any of a great number of acids, such as hydrochloric, sulfuric, propionic, benzoic, citric and the like may be employed.

The lipolytic hydrolysis may be carried on within a rather wide range of temperatures, the preferred range being from about 80° to 110° F. Temperatures below about 40° to 50° F. are less desirable because of the slowness of the hydrolysis and because of the tendency of the less soluble portions of the oil to crystallize out at low temperatures. Temperatures above about 140° F. are to be avoided, at least until the desired degree of hydrolysis has been effected, because such temperatures inactivate the lipase, and in fact its activity may be somewhat impaired at temperatures between 125° F. and 140° F.

The amount of water used is relatively unimportant, although an unnecessarily large amount is obviously objectionable because much of it will settle out unless the charge undergoing treatment is continuously agitated or maintained in an emulsified condition.

After the desired degree of hydrolytic action has taken place, which for the preparation of an improved drying oil from marine oils corresponds to an increase in free fatty acids of at least about 10 per cent (the free fatty acid content of the partially hydrolyzed oil usually being between 15 per cent and 50 per cent at the end of the hydrolysis, for preferred results) the oil is removed from the influence of active lipase in any convenient manner, such as by heating the charge (preferably to above 140° F.) to inactivate the ferment, or by adding an alkaline material to increase the pH materially, or by removing the lipolytic material by filtration or centrifugal action, or the like.

The desired degree of hydrolysis is most appropriately judged by determining the change in iodine value of the unhydrolized glycerine fraction (and/or of the liberated fatty acid fraction) as compared with the iodine value of the original oil. The selective hydrolysis is usually continued until the iodine value of the unsplit glyceride fraction is at least 15 to 20 units higher than that of the original oil, and in the case of the more unsaturated fish oils such as pilchard, sardine, and menhaden, the hydrolysis is usually continued until the unsplit glyceride fraction has an iodine value of at least 190°. When an object is to obtain a relatively high titer mixture of fatty acids from fish oil the hydrolysis is ordinarily stopped before more than 35 per cent of free fatty acids have been liberated.

The free fatty acids are separated from the residual glycerides by any convenient method. Combining the free fatty acids with alkali and settling out the foots, as in ordinary caustic refining of crude glyceride oils, may be resorted to if the amount of free fatty acids in the partially hydrolyzed mass is sufficiently low. Solvent refining, including the procedure described in Example 2, is convenient and effective in some cases. Ordinarily it is found more expedient to remove the fatty acids by continuous steam vacuum distillation or by means of flash distillation as in Example 1, although solvent extraction of the fatty acids or their crystallization from solvent, or other means of separation may be employed if desired.

Having thus described my invention, what I claim and desire to secure by Letters Patent is:

1. The process of liberating and separating substantial proportions of the lower molecular weight fatty acids from a mixture of glycerides having fatty radicals within the range $C_{12}$ to $C_{24}$ and including some which contain at least 6 more carbon atoms per radical than others, which comprises subjecting said mixtures of glycerides, at a temperature between about 40° F. and about 140° F. and above that at which substantial amounts of solid fats separate from the oil, to the action of an active lipase of the group consisting of oil seed lipases and steapsin, in the presence of an aqueous phase until said lower molecular weight fatty acids have been liberated to a substantial extent as a result of preferential enzyme hydrolysis, and until the free fatty acid content of the oil has increased at least about 10 percent and not substantially above the percentage content of lower molecular weight combined fatty acids in the original oil, then removing the partially hydrolyzed oil from the influence of active lipase and separating said free fatty acids from a residual mixture of glycerides of fatty acids having on the average longer carbon chains than those of the liberated fatty acids, and at any time following the partial hydrolysis substantially separating the aqueous glycerin phase from the oil phase.

2. The process of making an improved drying oil from fish oil, which comprises subjecting fish oil at a temperature between 40° F. and 140° F. and above that at which substantial amounts of solid fats separate from the oil, to the action of an active lipase of the group consisting of oil seed lipases and steapsin, in the presence of an aqueous phase until the free fatty acid content of the oil has increased to a value between about 15 per cent and about 50 per cent and until the iodine value of the neutral oil portion of the partially hydrolyzed oil has increased to a value at least 15 units above that of the original oil, then removing the partially hydrolyzed fat from the influence of active lipase, and separating the free fatty acids from the residual glycerides, and at any time following the partial hydrolysis substantially separating the aqueous glycerin phase from the oil phase.

3. The process of making an improved drying oil from fish oil, which comprises subjecting fish oil at a temperature between 60° F. and 125° F. to the action of an active lipase of the group consisting of oil seed lipases and steapsin, in the presence of an aqueous phase until the free fatty acid content of the oil has increased materially and until the iodine value of the neutral oil portion of the partially hydrolyzed oil has increased to a value at least about 15 units above that of the original oil, separating the aqueous glycerin phase from the oil, removing the residual lipase from the oil, and separating the free fatty acids from the residual glycerides.

4. The process of making an improved drying oil from fish oil, which comprises subjecting fish oil at a temperature between 60° F. and 125° F. to the action of ative lipase steapsin in the presence of an aqueous phase until the free fatty acid content of the oil has increased materially and until the iodine value of the neutral oil portion of the partially hydrolyzed oil has increased to a value at least about 15 units above that of the original oil, separating the aqueous glycerin phase from the oil, removing the residual lipase from the oil, and separating the free fatty acids from the residual glycerides.

5. The process of making an improved drying oil from fish oil, which comprises subjecting fish oil at a temperature between 80° F. and 110° F. to the action of active lipase steapsin in the presence of an aqueous phase and a small amount of bile salts until the free fatty acid content of the oil has increased materially and until the iodine value of the neutral oil portion of the partially hydrolyzed oil has increased to a value at least about 15 units above that of the original oil, separating the aqueous glycerin phase from the oil, heating the mixture to above 110° F. and removing the residual lipase from the oil, and separating the free fatty acids from the residual glycerides.

6. The process of making an improved drying oil from fish oil, which comprises subjecting fish oil at a temperature between 80° F. and 110° F. to the action of ricinus lipase in the presence of an aqueous phase containing a fraction of one per cent of a weak water-soluble acid until the free fatty acid content of the oil has increased materially and until the iodine value of the neutral oil portion of the partially hydrolyzed oil has increased to a value at least about 15 units above that of its original oil, separating the aqueous glycerin phase from the oil, heating the mixture to above 110° F., removing the residual lipase from the oil, and separating the free fatty acids from the residual glycerides.

7. The process of making an improved drying oil from a high iodine value fish oil selected from the group consisting of pilchard, sardine, and menhaden oils, which comprises subjecting said oil at a temperature of about 80° F. to about 110° F. to the action of about one per cent by weight of solvent extracted ground castor bean meal containing ricinus lipase, in the presence of a relatively small proportion of water containing about one quarter of one per cent by weight of commercial acetic acid until the free fatty acid content of the oil has increased to between 15 per cent and 50 per cent and until the iodine value of the neutral oil portion of the partially hydrolyzed oil has increased to at least about 190, drawing off the aqueous glycerin phase, heating the oil to about 130° to 180° F. and filtering in the presence of a filter aid, and separating the free fatty acids from the residual glycerides.

8. The process of making a relatively high titer mixture of fatty acids from fish oil, which comprises subjecting fish oil at a temperature between 60° F. and 125° F. to the action of an active lipase of the group consisting of oil seed lipases and steapsin, in the presence of an aqueous phase until at least about 10 per cent but not over about 35 per cent of fatty acids have been liberated, then removing the partially hydrolyzed oil from the influence of active lipase, and separating free fatty acids (having a lower composite iodine value and a higher titer than the original oil) from the residual glycerides, and at any time following the partial hydrolysis substantially separating the aqueous glycerin phase from the oil phase.

9. The process of claim 6, in which the water-soluble acid is acetic acid.

10. The process of claim 2 in which free hydroxyl groups contained in the residual glycerides after separation of free fatty acids are esterified with unsaturated fatty acids.

JUDSON H. SANDERS.

REFERENCES CITED

The following references are of record in the file of this patent:

UNITED STATES PATENTS

| Number | Name | Date |
|---|---|---|
| 1,015,994 | Connstein | Jan. 30, 1912 |
| 2,190,616 | Thurman | Feb. 13, 1940 |
| 2,310,986 | Murphy | Feb. 16, 1943 |

FOREIGN PATENTS

| Number | Country | Date |
|---|---|---|
| 22,111 | Great Britain | 1902 |

OTHER REFERENCES

Chemical Abstracts 34: 4083 (7-8), Hydrolysis of fats and esters, I, Ono, J. Agr. Chem. Soc. Japan 16, 43-54, 1940.

Chemical Abstracts 34: 4747 (5-7), ibid. V, 1085-96 (1939).

Chemical Abstracts 32: 1287 (9), Hydrolysis of glycerides by crude pancreas lipase. Balls et al., J. Biol. Chem. 122, 125-37 (1937).

Chemical Abstracts 24: 872 (4), Decomposition of various fatty oils by means of fat-decomposing enzymes. J. Exptl. Digestive Diseases, Japan 28, 190-4 (1929).

Certificate of Correction

Patent No. 2,485,779                                                  October 25, 1949

JUDSON H. SANDERS

It is hereby certified that errors appear in the printed specification of the above numbered patent requiring correction as follows:

Column 3, line 14, for "adversed" read *adverse*; column 4, line 20, for the word "includes" read *include*; line 51, for "100 F." read *100° F.*; line 57, for "glycerines" read *glycerides*; column 5, line 2, for "whaleoil" read *whale oil*; line 56, for "glycerine" read *glyceride*;

and that the said Letters Patent should be read with these corrections therein that the same may conform to the record of the case in the Patent Office.

Signed and sealed this 14th day of March, A. D. 1950.

[SEAL]

THOMAS F. MURPHY,
*Assistant Commissioner of Patents.*